(12) United States Patent
Roberts et al.

(10) Patent No.: US 9,960,481 B2
(45) Date of Patent: May 1, 2018

(54) HITCH MOUNT FOR ANTENNA SYSTEMS

(71) Applicant: DISH Technologies L.L.C, Englewood, CO (US)

(72) Inventors: William Roberts, Centennial, CO (US); Matthew Bailey, Centennial, CO (US)

(73) Assignee: DISH Technologies L.L.C., Englewood, CO (US)

( * ) Notice: Subject to any disclaimer, the term of this patent is extended or adjusted under 35 U.S.C. 154(b) by 62 days.

(21) Appl. No.: 15/046,832

(22) Filed: Feb. 18, 2016

(65) Prior Publication Data

US 2017/0244147 A1    Aug. 24, 2017

(51) Int. Cl.
*H01Q 1/32* (2006.01)
*H01Q 1/12* (2006.01)
*B60R 9/06* (2006.01)

(52) U.S. Cl.
CPC .............. *H01Q 1/325* (2013.01); *B60R 9/06* (2013.01); *H01Q 1/1207* (2013.01); *H01Q 1/1242* (2013.01)

(58) Field of Classification Search
CPC .. H01Q 1/1207; H01Q 1/1228; H01Q 1/1242; H01Q 1/3283; H01Q 1/3291; B60R 9/00; B60R 9/06
See application file for complete search history.

(56) References Cited

U.S. PATENT DOCUMENTS

| | | | | |
|---|---|---|---|---|
| 5,647,567 A | * | 7/1997 | Pugh, Jr. | H01Q 1/1221 248/237 |
| 6,195,066 B1 | * | 2/2001 | Pegues, Jr. | H01Q 1/125 248/237 |
| 2005/0146483 A1 | * | 7/2005 | Levasseur | H01Q 1/3283 343/878 |
| 2015/0146114 A1 | * | 5/2015 | Williams | H04N 5/655 348/837 |

* cited by examiner

*Primary Examiner* — Robert Karacsony
(74) *Attorney, Agent, or Firm* — Seed IP Law Group LLP

(57) ABSTRACT

Various embodiments provide an antenna hitch mount for securing an antenna, such as a satellite dish, to a vehicle. According to one embodiment, the hitch mount includes a hitch mounting portion, a plate, and an antenna mounting portion. The hitch mounting portion is configured to be inserted in to a hitch. The hitch mounting portion includes holes that are on opposite sides of the hitch mounting portion and are aligned with each other. The plate is used to couple the hitch mounting portion and the antenna mounting portion to each other. The antenna mounting portion is configured to support an antenna. Namely, an antenna is secured to the antenna mounting portion by a fastening device, such as a mast clamp.

13 Claims, 6 Drawing Sheets

HITCH MOUNT FOR ANTENNA SYSTEMS

BACKGROUND

Technical Field

The present disclosure is directed to a hitch mount for an antenna, such as a satellite dish.

Description of the Related Art

Antennas, such as satellite dishes, for direct-broadcast satellite (DBS) or broadband antenna systems are generally mounted proximate to a user's house. Many users, however, desire to view television or have broadband internet access while away from their home or while working in the field. For example, many users enjoy having television or broadband internet access while camping, tailgating, or traveling by car. Current solutions for remote television and broadband internet access typically require users to purchase a separate portable antenna system that consists of a scaled-down antenna within a protective housing. This is not ideal for the casual user who wishes to have remote television or broadband internet access occasionally because these portable antenna systems can cost hundreds of dollars. Thus, it is desirable to have a low cost solution for remote television and broadband internet access.

BRIEF SUMMARY

The present disclosure provides an antenna hitch mount for securing an antenna, such as a satellite dish, to a vehicle.

According to one embodiment, the hitch mount includes a hitch mounting portion, a plate coupled to the hitch mounting portion, and an antenna mounting portion coupled to the plate. The hitch mounting portion is configured to be inserted in to a hitch. The hitch mounting portion includes holes that are on opposite sides of the hitch mounting portion and are aligned with each other. In one embodiment, the hitch mounting portion is a square tube. The plate is used to couple the hitch mounting portion and the antenna mounting portion to each other. In one embodiment, the plate is a square plate. The antenna mounting portion is configured to support an antenna. Namely, an antenna is secured to the antenna mounting portion by a fastening device, such as a mast clamp. In one embodiment, the antenna mounting portion is a circular tube.

The antenna hitch mount disclosed herein provides a low cost solution for remote television and broadband internet access by allowing a user to attach the same antenna that is used for his or her home to a vehicle for use at remote locations.

DETAILED DESCRIPTION

Figure 1:
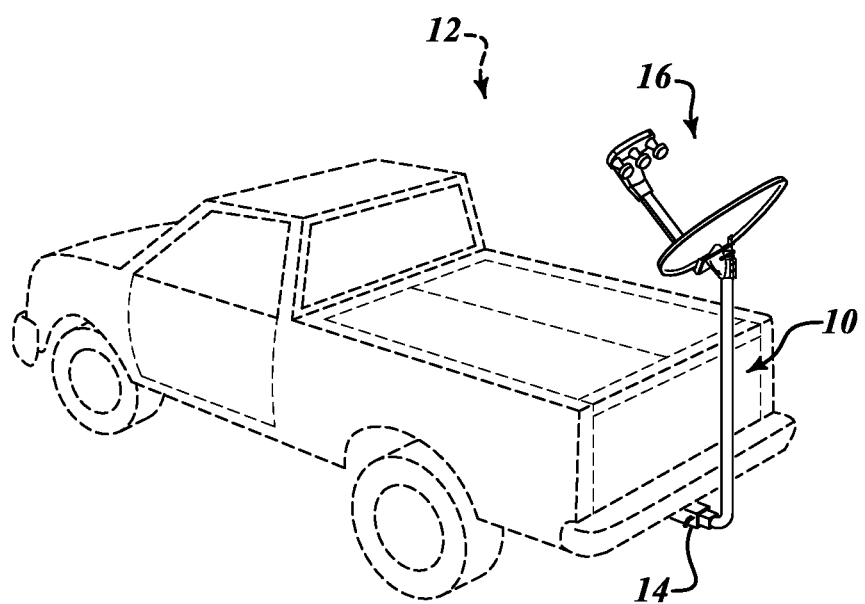
FIG. 1 is a simplified view of an antenna hitch mount secured to a vehicle according to one embodiment as disclosed herein.

In the following description, certain specific details are set forth in order to provide a thorough understanding of various embodiments of the disclosure. However, one skilled in the art will understand that the disclosure may be practiced without these specific details. In some instances, well-known details associated with mounts have not been described to avoid obscuring the descriptions of the embodiments of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

FIG. 1 is a simplified view of an antenna hitch mount 10 secured to a vehicle 12 according to principles disclosed herein.

The antenna hitch mount 10 is secured to a hitch 14 of the vehicle 12. As is known, the hitch 14 is used to affix or fasten attachments, such as a bike rack or a trailer, to the vehicle 12. As shown in FIG. 1, the antenna hitch mount 10 is inserted in to the hitch 14 and extends horizontally to clear the rear of the vehicle 12 and extends vertically to clear the top of the vehicle 12 and allow an antenna 16 to be secured at the top of the hitch mount 10. The antenna 16 may be any type of antenna, such as a satellite dish. It should be noted that the vehicle 12 is shown as a truck for illustrative purposes. The vehicle 12 is may be secured to any type of vehicle with a hitch, such as a car and a recreational vehicle.

Figure 2:
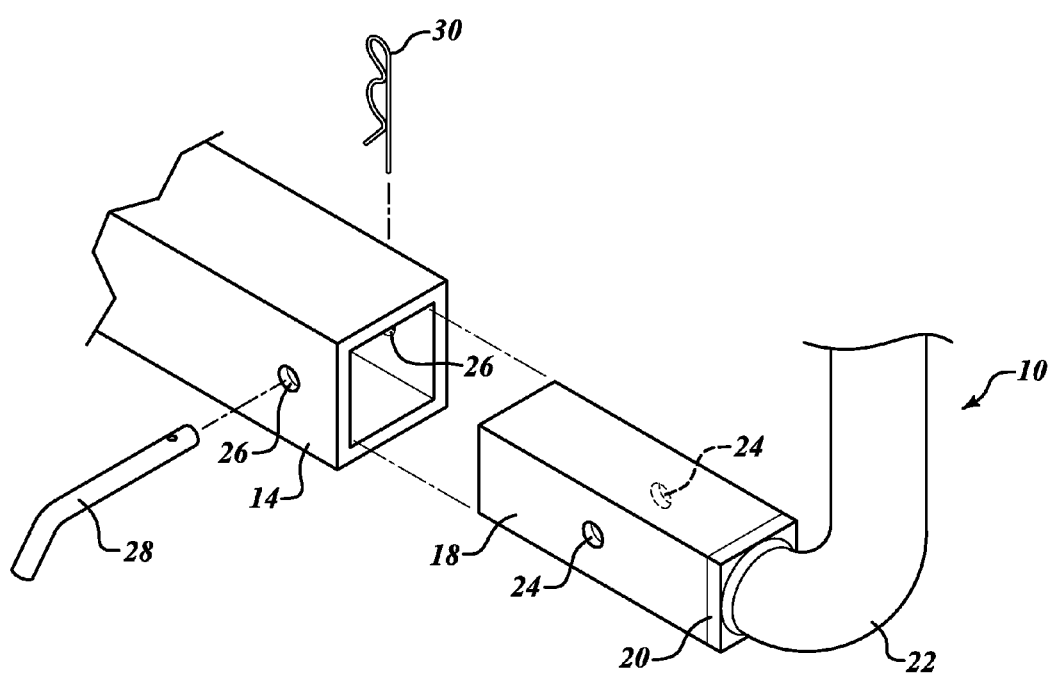
FIG. 2 is a simplified close-up view of an antenna hitch mount being inserted and secured to a vehicle's hitch according to one embodiment as disclosed herein.

FIG. 2 is a simplified close-up view of the antenna hitch mount 10 being inserted and secured to the hitch 14 according to principles disclosed herein.

The antenna hitch mount 10 includes a hitch mounting portion 18, a plate 20, and an antenna mounting portion 22. The hitch mounting portion 18 includes two holes 24 that are on opposite sides of the hitch mounting portion 18 and are aligned with each other. The hitch 14 includes first and second holes 26. The antenna hitch mount 10 will be discussed in further detail with respect to FIGS. 4-7.

The antenna hitch mount 10 is inserted in to the hitch 14 until the holes 24 of the hitch mounting portion 18 and the holes 26 of the hitch 14 are all aligned with each other. Once aligned, a pin 28 is inserted through the holes 24 of the hitch mounting portion 18 and the holes 26 of the hitch 14 and secured in position by a clip 30. It should be noted that the pin 28 and the clip 30 are shown for illustrative purposes. The antenna hitch mount 10 may be secured to the hitch 14 by any type of locking pin.

Figure 3A:
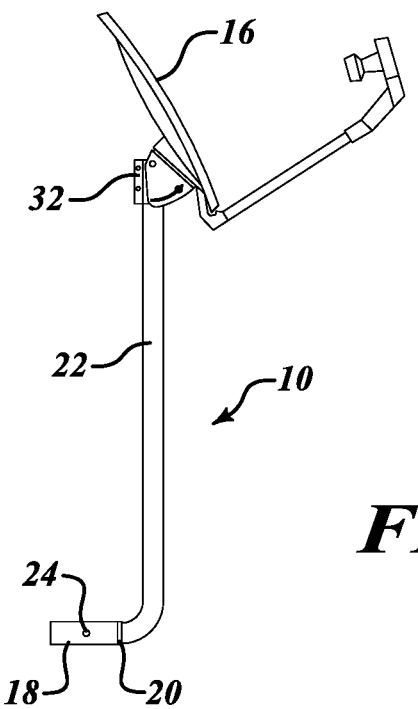
FIG. 3A is a simplified side view of an antenna secured to an antenna hitch mount according to one embodiment as disclosed herein.
Figure 3B:
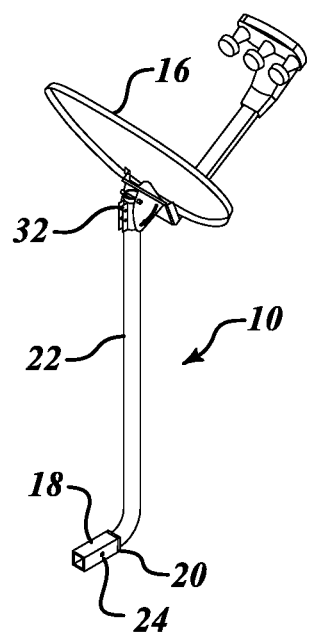
FIG. 3B is a simplified isometric view of an antenna secured to an antenna hitch mount according to one embodiment as disclosed herein.

FIG. 3A is a simplified side view of the antenna 16 secured to the antenna hitch mount 10 according to principles disclosed herein. FIG. 3B is a simplified angled view of the antenna 16 secured to the antenna hitch mount 10 according to principles disclosed herein.

The antenna 16 is secured to the antenna mounting portion 22 of the antenna hitch mount 10 by a mast clamp 32. The antenna 16 may be positioned along any portion of the antenna mounting portion 22. In a preferred embodiment, as shown in FIGS. 3A and 3B, the antenna 16 is secured to the top antenna mounting portion 22 to maximize the height position of the antenna 16 and minimize poor reception of signals.

Figure 4:
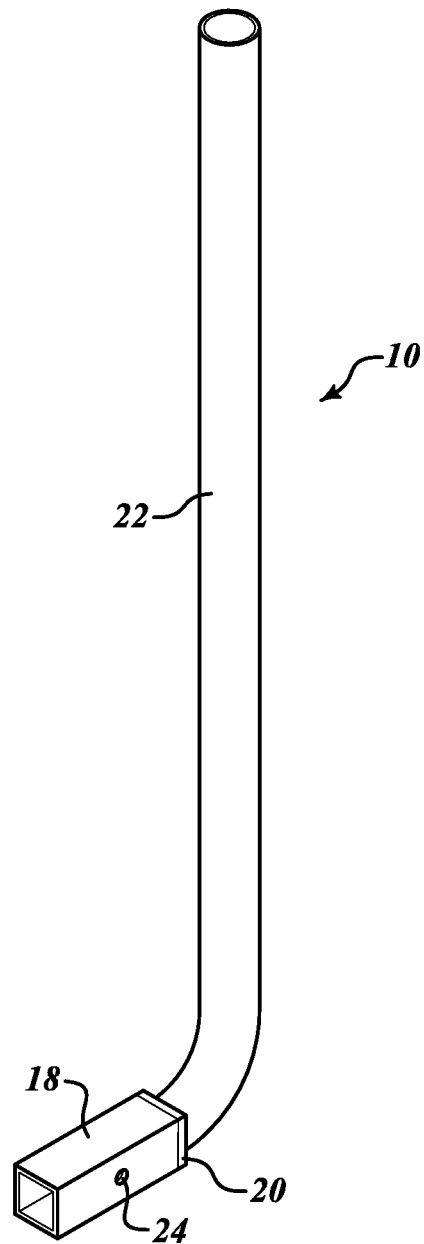
FIG. 4 is a simplified isometric view of an antenna hitch mount according to one embodiment disclosed herein.

FIG. 4 is a simplified angled view of the antenna hitch mount 10 according to principles disclosed herein.

Figure 5A:
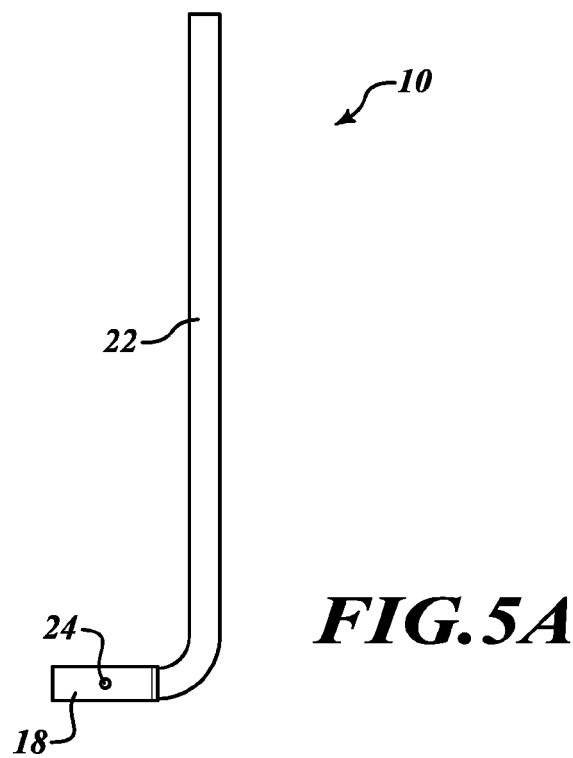
FIG. 5A is a first simplified side view of an antenna hitch mount according to one embodiment disclosed herein.
Figure 5B:
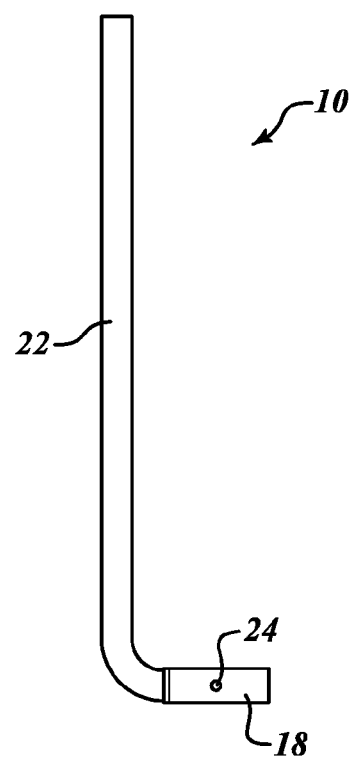
FIG. 5B is a second simplified side view of an antenna hitch mount according to one embodiment disclosed herein.
Figure 6:
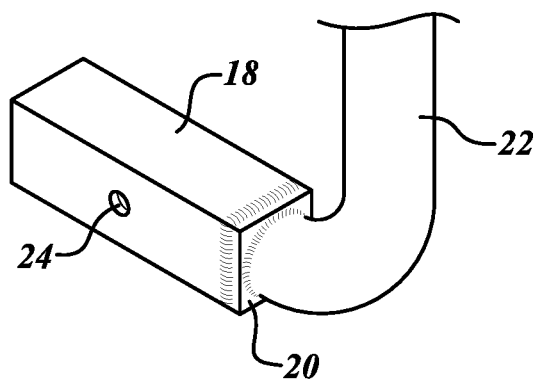
FIG. 6 is a simplified close-up isometric view of an antenna hitch mount according to one embodiment as disclosed herein.
Figure 7:
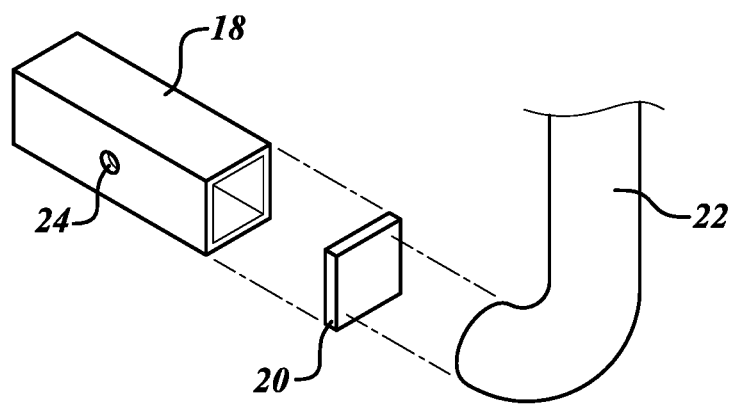
FIG. 7 is a simplified exploded view of an antenna hitch mount according to one embodiment as disclosed herein.

It is beneficial to review FIG. 4 simultaneously with FIG. 5A, FIG. 5B, FIG. 6, and FIG. 7. FIG. 5A is a first simplified side view of the antenna hitch mount 10. FIG. 5B is a second simplified side view of the antenna hitch mount 10. FIG. 6 is a simplified close-up angled view of the antenna hitch mount 10. FIG. 7 is a simplified exploded view of the antenna hitch mount 10.

As previously discussed, the antenna hitch mount 10 includes the hitch mounting portion 18, the plate 20, and the antenna mounting portion 22. As best shown in FIG. 6 and FIG. 7, the plate 20 is coupled to the hitch mounting portion 18, and the antenna mounting portion 22 is coupled to the plate 20. The hitch mounting portion 18, the plate 20, and the antenna mounting portion 22 may be coupled together by any process that joins materials together. In a preferred embodiment, the mounting portion 18, the plate 20, and the antenna mounting portion 22 are welded together.

The hitch mounting portion 18 is configured to be inserted in to the hitch 14. The hitch mounting portion 18 includes the holes 24. As best shown in FIG. 5A and FIG. 5B, the holes 24 are on opposite sides of the hitch mounting portion 18 and are aligned with each other. As discussed with respect to FIG. 2, the holes 24 are configured to receive the pin 28.

In a preferred embodiment, the hitch mounting portion 18, as shown in FIG. 4, is a hollow tube to reduce the overall weight of the antenna hitch mount 10. In another embodiment, the hitch mounting portion 18 is a solid bar.

The hitch mounting portion 18 may have any shape. In one embodiment, as shown in FIG. 4, the hitch mounting portion 18 is a square tube. In another embodiment, the hitch mounting portion 18 is a circular tube. In a preferred embodiment, the height and width of the hitch mounting portion each have a range between one to three inches.

The hitch mounting portion 18 has a length that is long enough for the antenna mounting portion 22 to clear the rear of a vehicle when the hitch mounting portion 18 is inserted in to the hitch 14. For example, as shown in FIG. 1, the antenna mounting portion 22 clears the rear of the vehicle 12 when the antenna hitch mount 10 is secured to a hitch 14. In a preferred embodiment, the hitch mounting portion 18 has a length having a range between six to ten inches.

The plate 20, as best shown in FIG. 6 and FIG. 7, is used to couple the hitch mounting portion 18 and the antenna mounting portion 22 to each other. In a preferred embodiment, the plate 20 has the same shape and dimensions as the hitch mounting portion 18. For example, as shown in FIG. 7, the plate 20 has the same shape, height, and width of the hitch mounting portion 18.

The antenna mounting portion 22 is configured to support an antenna. Namely, an antenna is secured to the antenna mounting portion 22 by a fastening device. For example, as shown in FIG. 3A and FIG. 3B, the antenna 16 is secured to the antenna mounting portion 22 of the antenna hitch mount 10 by a mast clamp 32.

In a preferred embodiment, the antenna mounting portion 22, as shown in FIG. 4, is a hollow tube to reduce the overall weight of the antenna hitch mount 10. In another embodiment, the hitch mounting portion 18 is a solid bar.

The antenna mounting portion 22 may have any shape. In a one embodiment, as shown in FIG. 4, the hitch mounting portion 18 is a circular tube with a diameter having a range between one to three inches. In another embodiment, the antenna mounting portion 22 is a square tube.

The antenna mounting portion 22 may have any length. In a preferred embodiment, the antenna mounting portion 22 has length long enough for an attached antenna to clear the height of a rear of a vehicle. For example, as shown in FIG. 1, the antenna mounting portion 22 is tall enough such that the antenna 16 is higher than the rear of the vehicle 12. In a preferred embodiment, the antenna mounting portion 22 has a length having a range between 30 to 50 inches.

The antenna hitch mount 10, including the hitch mounting portion 18, the plate 20, and the antenna mounting portion 22, may be made of any material that is not susceptible to damage or bending when exposed to natural forces, such as wind or rain. In a preferred embodiment, the hitch mounting portion 18, the plate 20, and the antenna mounting portion 22 are made of a metal, such as steel.

The antenna hitch mount 10 disclosed herein results in a hitch mount that secures an antenna, such as a satellite dish, to a hitch of vehicle. The antenna hitch mount 10 provides a low cost solution for remote television or broadband internet access as users are able to use the same antenna system for their home and activities away from their home.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   a satellite dish;
   a curved circular tube having a first end and a second end opposite the first end, the first end being attached to the satellite dish and having a first opening;
   a square plate having a first face and a second face opposite to the first face, the first face of the square plate being attached to the second end of the curved circular tube; and
   a square tube configured to be inserted in to a hitch of a vehicle, the square tube having a third end, a fourth end opposite the third end, and first and second holes that are aligned with each other to permit a single straight rod to be positioned in both the first and second holes, the third end being attached to the second face of the square plate, the third end having a face that has substantially the same outer area dimensions as the second face such that outer perimeter surfaces of the square plate are flush with outer perimeter surfaces of the square tube, the fourth end having a second opening.

2. The system of claim 1, wherein the curved circular tube has a first portion and a second portion, the first portion having a first length that is aligned along a first axis, the second portion having a second length that is aligned along a second axis that is substantially perpendicular to the first axis.

3. The system of claim 2, wherein the second length is larger than the first length.

4. The system of claim 2, wherein the first length has a length having a range from 30 inches to 50 inches.

5. The system of claim 2, wherein the square tube has a third length that is aligned along the first axis, and the second length is larger than the third length.

6. A hitch mount, comprising:
a curved circular tube having a first end and a second end opposite the first end, the first end being configured to be attached to a satellite dish, the first end having a first opening;
a square plate having a first face, a second face opposite to the first face, and four outer surfaces, the second end being attached to the first face; and
a square tube configured to be inserted in to a hitch, the square tube having a third end, a fourth end opposite the third end, first and second holes that are aligned with each other, and four outer surfaces, the third end being attached to the second face, the fourth end having a second opening, the four outer surfaces of the square plate being flush with the four outer surfaces of the square tube.

7. The hitch mount of claim 6, wherein the curved circular tube has a first portion and a second portion, the first portion having a first length that is aligned along a first axis, the second portion having a second length that is aligned along a second axis that is substantially perpendicular to the first axis.

8. The hitch mount of claim 6, wherein the square tube has a third length that is aligned along the first axis, and the second length is larger than the third length.

9. A hitch mount, comprising:
a hitch mounting portion configured to be inserted in to a hitch of a vehicle, the hitch mounting portion having a first end, a second end opposite the first end, a first opening at the first end, and first and second holes that are aligned with each other to permit a single straight rod to be positioned in both the first and second holes, the second end having an end face that has a height and a width;
a plate having a first face and a second face opposite to the first face, the first face of the plate being attached to the second end of the hitch mounting portion, the first face having a height and width that is substantially equal to the height and the width, respectively, of the end face of the second end of the hitch mounting portion; and
a satellite dish mounting portion configured to be attached to a satellite dish, the satellite dish mounting portion having a third end, a fourth end opposite of the third end, a second opening at the third end, the fourth end being attached to the second face.

10. The mount of claim 9, wherein the hitch mounting portion has a first length that is aligned along a first axis, and the satellite dish mounting portion has a second length that is aligned along a second axis that is substantially perpendicular to the first axis.

11. The mount of claim 9, wherein the hitch mounting portion has a length having a range from 30 inches to 50 inches.

12. The mount of claim 9, wherein the hitch mounting portion is a square tube.

13. The mount of claim 9, wherein the hitch mounting portion is a circular tube.

* * * * *